United States Patent [19]

Clement

[11] Patent Number: 4,662,341
[45] Date of Patent: May 5, 1987

[54] AIR INLET NECK, IN PARTICULAR FOR AN AIR ADMISSION SYSTEM IN AN INTERNAL COMBUSTION ENGINE

[75] Inventor: Pierre Clement, Pont-De-Roide, France

[73] Assignee: Aciers et Outillage Peugeot, France

[21] Appl. No.: 863,914

[22] Filed: May 16, 1986

[30] Foreign Application Priority Data

May 17, 1985 [FR] France ............................ 85-07485
May 17, 1985 [FR] France ............................ 85-07486

[51] Int. Cl.4 .................................................. F02M 31/00
[52] U.S. Cl. .................................... 123/556; 123/542
[58] Field of Search ............... 123/556, 545, 546, 542; 239/91 D; 137/111; 236/12.15, 12.17, 12.19, 13

[56] References Cited

U.S. PATENT DOCUMENTS

| 1,366,965 | 2/1921 | Smith | 123/556 |
| 1,864,375 | 6/1932 | Root | 123/556 |
| 1,961,639 | 6/1934 | Mears | 123/556 |
| 2,443,326 | 6/1948 | Rohm | 123/556 |
| 3,989,186 | 11/1976 | McMichael | 236/13 |

FOREIGN PATENT DOCUMENTS

| 0982505 | 6/1951 | France | 123/556 |
| 1328385 | 4/1963 | France | 123/556 |
| 2026587 | 9/1970 | France | 123/556 |
| 0026783 | 9/1910 | United Kingdom | 123/556 |

Primary Examiner—Ronald B. Cox
Attorney, Agent, or Firm—Sughrue, Mion, Zinn, Macpeak, and Seas

[57] ABSTRACT

The air inlet neck, in particular for the air admission system in an internal combustion engine, comprises a mixing chamber (10) into which open a cold air admission pipe (4) and a hot air admission pipe (14). The mixing chamber (10) communicates with an outlet pipe (15) for the air of the mixing chamber. One of said pipes (4) is coaxial with the mixing chamber (10) and includes closing means constituted by flaps (5) pivotally connected to the admission pipe (4) and actuated by a cylindrical member (9) mounted to be movable between a position of complete closure of the admission pipe (4) by the flaps (5) and a position for retracting the flaps. The cylindrical member (9) constitutes means for closing the other admission pipe (14).

24 Claims, 6 Drawing Figures

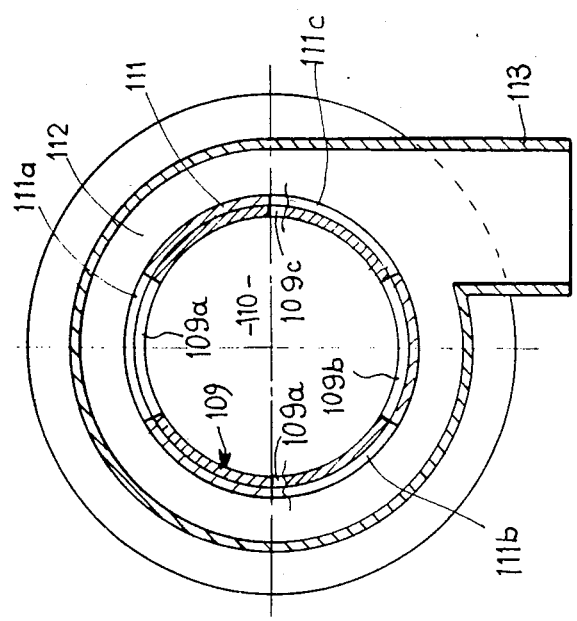
FIG.5
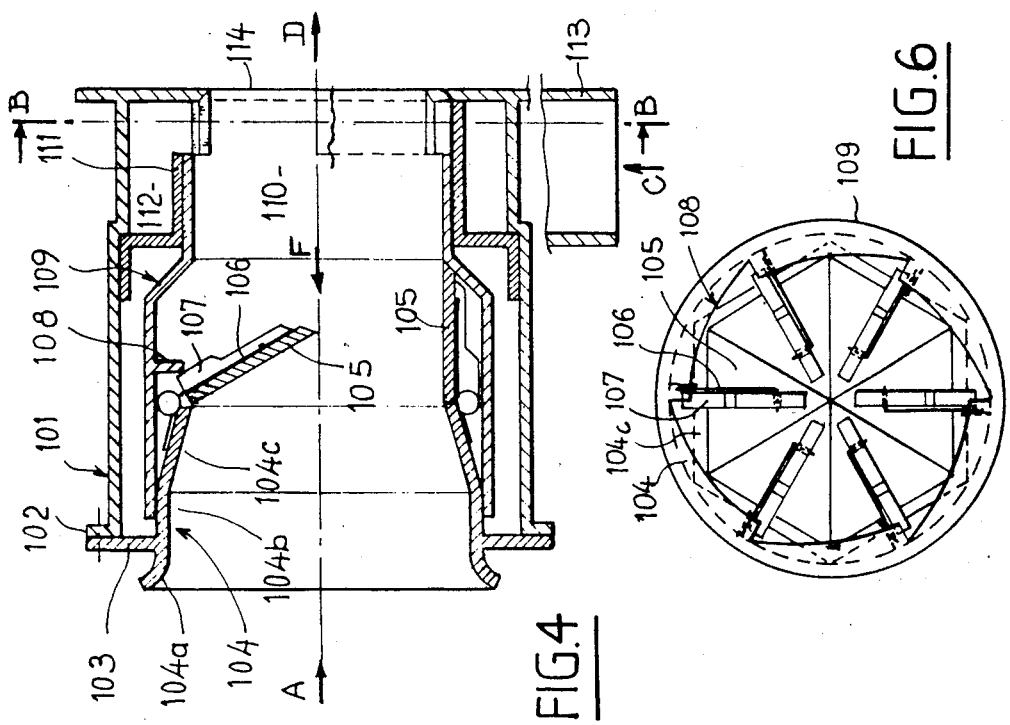
FIG.4
FIG.6

AIR INLET NECK, IN PARTICULAR FOR AN AIR ADMISSION SYSTEM IN AN INTERNAL COMBUSTION ENGINE

The present invention relates to devices for supplying air to internal combustion engines.

More precisely, the invention relates to an air inlet neck for an air admission system in an engine of this type.

These devices are generally used for regulating the temperature of the air admitted to the engine at a reference or set value. The devices of the art comprise a mixing chamber into which open a pipe for the admission of cold air, such as the air of the atmosphere, and a pipe for the admission of hot air coming from a "hot" part of the engine.

The regulation of the temperature ofthe air admitted to the engine is achieved by a single flap controlled by a thermostatic device. This flap is placed in the convergence of the two admission pipes, so as to permit a regulation of the admission of the hot air and cold air in the mixture. However, this type of device has a certain number of drawbacks.

Indeed, these devices have a relatively large overall size which, in certain cases, may be a hindrance. Further, owing to the structure of such devices, the flow of the air is not optimized, and this results in pressure drops which have for result a decrease in the available power in the engine.

Another drawback of these devices results from the fact that the flap for regulating the temperature of the admitted air is actuated by a linkage and direction-changing means which are relatively complex and costly to produce.

An object of the invention is therefore to overcome the problems mentioned hereinbefore.

The invention therefore provides an air inlet neck, in particular for an air admission system in an internal combustion engine, comprising a mixing chamber into which open a cold air admission pipe and a hot air admission pipe and which communicates with an outlet pipe for the air of the mixing chamber, and adjustable closing means for the admission pipes, wherein one of said admission pipes is coaxial with the mixing chamber and the closing means of this pipe are constituted by flaps pivotally mounted on said pipe and actuated by a cylindrical member which is mounted to be movable between a position of complete closure of the admission pipe by the flaps and a position in which the latter are retracted.

Advantageously, the cylindrical member constitutes the closing means of the other admission pipe.

According to one embodiment of the invention, the cylindrical member is movably mounted along the axis of the mixing chamber.

According to another embodiment of the invention, the cylindrical member is mounted to be movable around the mixing chamber.

A better understanding of the invention will be had from the following description which is given solely by way of example with reference to the accompanying drawings, in which:

FIG. 4 is a sectional view of a second embodiment of an air inlet neck according to the invention, in which the closing means of the air admission pipes are represented in their end positions;

FIG. 5 is a sectional view taken on line B—B of FIG.4, and,

FIG. 6 is a partial view in the direction indicated by the arrow F of FIG. 4, of the closing means for one of the air admission pipes.

Figure 1:
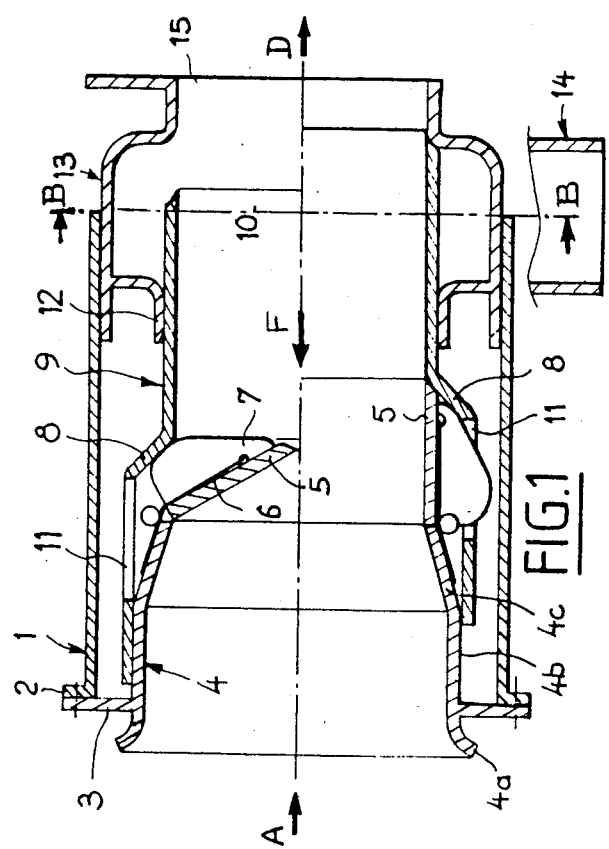
FIG. 1 is a sectional view of a first embodiment of an air inlet neck according to the invention in which the closing means for the air admission pipes are represented in their end positions.

As can be seen in FIG. 1, which represents a first embodiment of the invention, an air inlet neck according to the invention is constituted by a cylindrical body 1 including at one of its ends an annular flange 2 against which bears and is secured an annular flange 3 of a cold air admission pipe 4. This admission pipe 4 has, in succession in the direction indicated by the arrow A representing the direction of flow of the cold air, a flared end portion 4a, a cylindrical portion 4b and a wall portion in the shape of a frustum of a pyramid 4c which may advantageously have six sides. The annular flange 3 and these three portions are advantageously made from a moulding or casting.

A flap 5 is pivotally mounted on each side of the frustum of a pyramid 4c.

According to a first embodiment, these flaps are in one integral piece with the rest of the admission pipe 4, and the pivotal connection is achieved by a reduction in the section at the intersection of the flap and the corresponding side of the frustum of a pyramid. According to a second embodiment, the flaps 5 are made separately from the admission pipe 4 and are pivotally mounted on the latter by adhesive strips disposed on the sides of the frustum of a pyramid.

In both cases, a return spring 6, whose function will be explained hereinafter, is provided on each side of the frustum of a pyramid 4c and the corresponding flap 5.

Each flap 5 also includes a fin 7 integral with the latter and extending in a plane which is substantially perpendicular to the plane of the flap so as to bear against a shoulder 8 of a cylindrical member 9 which is mounted to be movable along the axis of a mixing chamber 10 coaxial with the cold air admission pipe 4. This cylindrical member 9 is connected to an actuating element of a thermostatic device (not shown) which is known per se and is formed for example by a wax cartridge. The operation of such a device will be described hereinafter.

As can be seen, one end of this cylindrical member 6 bears against the cylindrical portion 4b of the admission pipe 4.

A cavity 11, which may advantageously be in the form of an aperture, is provided in the cylindrical member 9 in facing relation to a corresponding fin 7.

The other end of said cylindrical member 9 bears against a flange 12 of an admission chamber 13 surrounding the mixing chamber 10 and into which opens a hot air admission pipe 14, as indicated by the arrow C. As can be seen, one end of the cylindrical body 1 bears against this chamber 13.

Depending on its position, this end of the cylindrical member 9 allows, or does not allow, the passage of the hot air from the admission chamber 13 into the mixing chamber 10. An outlet pipe 15 is connected to this mixing chamber 10 so as to permit the flow of air from this chamber, as indicated by the arrow D.

Figure 2:
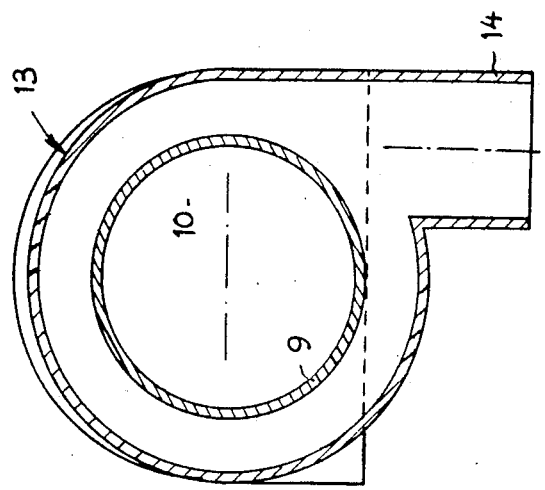
FIG. 2 is a sectional view taken on line B—B of FIG.1.

As can be seen in FIG. 2, the hot air admission pipe 14 opens into the admission chamber 13 which, depending on the position of the cylindrical member 9, is in communication with, or not in communication with, the mixing chamber 10.

In the illustrated embodiment, the admission chamber 13 is cylindrical and the axis of the hot air admission pipe 14 is substantially perpendicular to the axis of the mixing chamber 10.

Figure 3:
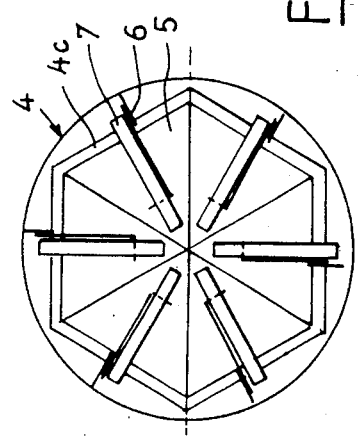
FIG. 3 is a partial view in the direction indicated by the arrow F of FIG. 1, of the closing means for one of the air admission pipes.

As shown more clearly in FIG. 3, the cold air admission pipe 4 comprises a wall portion in the shape of a frustum of a pyramid 4c on the sides of which there are pivotally mounted flaps 5, each of which is in the general shape of a triangle, through their base. As can be seen, this pivotal mounting can be achieved by a reduction in the section of the intersection of these flaps with the sides of the frustum of a pyramid when the flaps are cast in one piece with the admission pipe 4. According to a modification, when the flaps 5 are constructed separately from the admission pipe, they may be pivotally mounted on the latter by adhesive strips.

The fin 7 integral with the flap 5 is provided, for example, with an aperture receiving one end of the return spring 6 whose other end is connected to the corresponding side of the frustum of a pyramid 4c.

The device for closing the admission pipe 4 is therefore constituted by six identical flaps which, when they are in their closing position, prevent any flow of cold air into the mixing chamber 10.

Such a device operates in the following manner:

As can be seen in FIG. 1, the cylindrical member 9 is mounted to be slidable along the axis of the mixing chamber 10, between the latter and the admission chamber 13, so that when it is located in the position shown in the upper part of FIG. 1, the shoulder 8 of the member 9 bears against the fin 7 integral with the flap 5 so that the latter is brought to its position in which it closes the admission pipe 4. It will be understood that the other flaps are also in the same position. The cold air arriving in the direction indicated by arrow A therefore cannot flow into the mixing chamber 10 which, on the other hand, receives hot air through the space cleared by the cylindrical member 9 between the admission chamber 13 and the mixing chamber 10. The air admitted to the engine and flowing in the direction indicated by the arrow D, is therefore hot air.

On the other hand, and as can be seen more particularly in the lower part of FIG. 1, when the cylindrical member 9 is slid to the other position, it can be seen that it closes the admission chamber 13 and thus prevents any flow of hot air into the mixing chamber. On the other hand, the flange 8 of the cylindrical member 9 has released the fin 7 and the return spring 6 acts on the flap 5 so as to retract it from the cold air admission pipe. The return spring 6 therefore constitutes means for returning the flaps to a retracted position.

In this position, the cavities 11 receive the fins 7 which constitute the means for actuating the flaps. The mixing chamber therefore only receives the cold air which flows in the outlet pipe 15.

The cylindrical member 9 is made to slide by the thermostatic device which is responsive to the temperature of the air admitted to the engine. Indeed, the actuating element of such a device has a certain position for a reference or set value of temperature. Depending on whether the temperature of the admitted air is higher or lower than this set value, the element for actuating this thermostatic device moves in one direction or the other and thus brings about the sliding of the cylindrical member 9 along the axis of the mixing chamber and consequently the opening or the closing of the hot air or cold air admission pipes according as the temperature of the air admitted is higher or lower than the set temperature.

As can be seen, the cold air admission pipe 4 is coaxial with the mixing chamber 10 and the closing means for this pipe are formed by the flaps 5 pivotally mounted on the latter and actuated by the cylindrical member 9 mounted to be movable along the axis of the mixing chamber 10 between a position of the complete closure of this admission conduit by the flaps and a position of the withdrawal of the latter. Further, this cylindrical member constitutes, as has been seen, means for closing the other admission pipe and it is mounted to be slidable along the axis of the mixing chamber between a position of complete closure of this admission pipe and a retracted position.

As can be seen in FIG. 4, which represents a second embodiment of the invention, an air inlet neck according to the invention is constituted by a cylindrical body 101 having at one of its ends an annular flange 102 against which bears and is secured an annular flange 103 of a cold air admission pipe 104. This admission pipe 104 has, in succession, in the direction indicated by the arrow A representing the direction of flow of the cold air, a flared end portion 104a, a cylindrical portion 104b, and a wall portion in the shape of a frustum of a pyramid 104c which may advantageously have six sides. The annular flange 103 and these three portions are advantageously made from a moulding or casting.

A flap 105 is pivotally mounted on each side of the frustum of a pyramid 104c.

According to a first embodiment, these flaps 105 are in one integral piece with the rest of the admission pipe 104 and the pivotal connection is achieved by a reduced section at the intersection of the flap and the corresponding side of the frustum of a pyramid.

According to another embodiment, the flaps 105 are made separately from the admission pipe 104 and they are pivotally mounted on the latter by means of adhesive strips disposed on the sides of the frustum of a pyramid.

In either case, a return spring 106, whose function will be explained hereinafter, is provided on each side of the frustum of a pyramid 104c and the corresponding flap 105.

Each flap 105 also includes a fin 107 integral with the latter and extending in a plane substantially perpendicular to the plane of the flap so as to bear against a flange 108 whose shape will be defined hereinafter, of a cylindrical member 109 mounted to be movable around a mixing chamber 110 coaxial with the cold air admission pipe 104. This cylindrical member 109 is connected to an actuating element of a thermostatic device (not shown) which is known per se and is constituted, for example, by a wax cartridge. The operation of such a device will be described hereinafter.

As can be seen, one end of this cylindrical member 109 bears against the cylindrical portion 104b of the admission pipe 104.

The other end of the cylindrical member 109 bears against a wall 111 of an admission chamber 112 surrounding the mixing chamber 110 and into which opens a hot air admission pipe 113, as indicated by the arrow C.

The admission chamber 112, and more particularly the wall 111 and the corresponding end of the cylindrical member 109, are provided with openings which will be described in more detail hereinafter, which permit, or do not permit, depending on the angular position of the cylindrical member 109, the passage of hot air from the admission chamber 112 into the mixing chamber 110.

An outlet pipe 114 is connected to this mixing chamber 110 so as to permit the flow of the air from this chamber, as indicated by the arrow D.

As can be seen in FIG. 5, the hot air admission pipe 113 opens into the admission chamber 112 whose inner wall 111 advantageously has three openings 111a, 111b, 111c which are evenly spaced apart. Thus, for example, these three openings are offset 120° from each other. Likewise, the cylindrical member 109 advantageously has three openings 109a, 109b, 109c also offset 120° from each other. As can be seen in the upper part of FIG. 5, the cylindrical member 109 is in such angular position that the openings 111a and 109a are in facing relation to each other and thereby allow the hot air of the admission chamber 112 to enter the mixing chamber 110. On the other hand, in the angular position of the cylindrical member 109 represented in the lower part of FIG. 5, the openings are not in facing relation to each other and thus prevent any flow of hot air from the admission chamber 112 into the mixing chamber 110, the openings of the wall 111 being closed by solid portions of the cylindrical member 109.

In the illustrated embodiment, the admission chamber 112 is cylindrical and the axis of the hot air admission pipe 113 is substantially perpendicular to the axis of the mixing chamber 110.

As shown more clearly in FIG. 6, the cold air admission pipe 104 has a wall portion in the shape of a frustum of a pyramid 104c on the sides of which are pivotally mounted flaps 105, each of which is in the general shape of a triangle, by their base. As can be seen, this pivotal connection may be achieved by a reduction in the section at the intersetion of these flaps with the sides of the frustum of a pyramid when the flaps are cast or moulded with the admission pipe 104. According to a modification, when the flaps 105 are made separately from the admission pipe, they may be pivotally connected to the latter by adhesive strips.

The fin 107 integral with the flap 105 is provided, for example, with an aperture receiving one end of a return spring 106 whose other end is connected to the corresponding side of the frustum of a pyramid 104c.

The device for closing the admission pipe 104 is therefore constituted by six identical flaps which permit, when they are in their closing position, the prevention of any flow of cold air in the mixing chamber 110.

As already mentioned, the cylindrical member 109 is mounted to be rotatable around the mixing chamber 110 and this cylindrical member 109 has on its inner surface a flange 108 in which are formed six ramps disposed in confronting relation to the fins 107. These ramps permit, depending on the angular position of the cylindrical member 109, the shifting of the flaps 105 so as to completely retract these flaps from the admission pipe 104 or to bring them to their position in which they close this admission pipe, as shown in FIG. 6.

The inclination and the number of these ramps are determined in the known manner, in accordance with the number of flaps 105, the dimension and the distribution of the openings 109a, 109b, 109c and 111a, 111b and 111c, the angular displacement of the cylindrical member 109, etc.

As can be understood, the angular position of the cylindrical member 109 corresponding to the complete closure of the admission pipe 104 by the flaps 105, corresponds to an angular position in which the openings 109a, 109b and 109c of this cylindrical member are perfectly in confronting relation to the openings 111a, 111b and 111c of the admission chamber, so that the air admitted to the mixing chamber is hot air.

The angular position of the cylindrical member 109 corresponding to the complete withdrawal of the flaps 105 from the admission pipe 104 corresponds to a position of complete closure of the openings 111a, 111b, 111c of the wall of the admission chamber 112 by the solid portions of the cylindrical member 109.

Such a device operates in the following manner:

As can be seen in FIG. 4, the cylindrical member 109 is mounted to be rotatable around the mixing chamber 110, between the latter and the admission chamber 112, so that, when it is in the end angular position represented in the upper part of FIG. 4, the corresponding ramp of the flange 108 of the cylindrical member 109 bears against the fin 107 integral with the flap 105 so that the latter is brought to its position of closure of the admission pipe 104.

It will be clear that the other flaps are also in the same position. The cold air arriving in the direction indicated by the arrow A, therefore cannot flow into the mixing chamber 110 which, on the other hand, receives hot air through the openings 111a, 111b, 111c of the admission chamber 112 and the openings 109a, 109b and 109c of the cylindrical member 109 which, owing to the angular position of the latter, are in confronting relation to each other.

The air admitted to the engine and flowing in the direction indicated by the arrow D is therefore hot air.

On the other hand, as can be seen more particularly in the lower part of FIG. 4, when the cylindrical member 109 is in the other end position, it is clear that the flaps 105 are completely retracted from the admission pipe 104 and the openings 111a, 111b, 111c of the admission chamber 112 are completely closed by the solid portions of the cylindrical member 109. In this position, the flange 108 has released the fin 107 and the return spring 16 acts on the flap 105 in such manner as to retract it from the cold air admission pipe. The return springs 106 therefore constitute means for returning the flaps to the retracted position, while the flange 108, in which are formed the ramps cooperating with the fins 107 of the flaps 105, constitutes the actuating means of these flaps.

In the position shown in the lower part of FIG. 4, the mixing chamber 110 therefore only receives cold air which flows in the outlet pipe 114.

The cylindrical member 109 is rotated by the thermostic device which is responsive to the temperature of the air admitted to the engine. Indeed, the actuating element of such a device has a certain position for a reference or set temperature value. Depending on whether the temperature of the admitted air is higher or lower than this set value, the actuating element of the thermostatic device moves in one direction or the other and thus results in the rotation of the cylindrical member around the mixing chamber and therefore the opening or the closure of the cold air or hot air admission pipes, according as the temperature of the admitted air is higher or lower than the set temperature.

As can be seen, the cold air admission pipe 104 is coaxial with the mixing chamber 110 and the means for closing this pipe are formed by the flaps 105 pivotally mounted on the latter and actuated by the cylindrical member 109 which is mounted to be movable around the mixing chamber between a position for the complete closure of this admission pipe by these flaps and a position of the retraction of the latter.

Further, this cylindrical member constitutes, as has been seen, means for closing the other admission pipe and it is mounted to be movable around the mixing chamber between a position of complete closure of this admission pipe and a retracted position.

Although in the described embodiments the admission pipe coaxial with the mixing chamber is the cold air admission pipe, it may also be the hot air admission pipe.

What is claimed is :

1. An air inlet neck structure, in particular for an air admission system in an internal combustion engine, said neck structure comprising a mixing chamber, a cold air admission pipe and a hot air admission pipe, both opening into the mixing chamber, an outlet pipe for air of the mixing chamber communicating with the mixing chamber and adjustable closing means for the admission pipes, a first of said admission pipes being coaxial with the mixing chamber, the closing means for said first admission pipe comprising flaps pivotally connected to said first admission pipe, the neck structure further comprising a cylindrical member cooperable with the flaps so as to actuate the flaps and mounted in the structure to be movable between a position for complete closure of the first admission pipe by the flaps and a position in which the flaps are retracted.

2. An air inlet neck structure according to claim 1, wherein said cylindrical member constitutes the closing means for a second of said admission pipes.

3. An air inlet neck structure according to claim 1, wherein the cylindrical member is mounted to be movable axially along the mixing chamber.

4. An air inlet neck structure according to claim 1, wherein the cylindrical member is mounted to be axially slidable along the mixing chamber between a position of complete closure of said second admission pipe and a retracted position.

5. An air inlet neck structure according to claim 4, wherein the cylindrical member is mounted to be axially slidable between the mixing chamber and an admission chamber into which opens the second admission pipe.

6. An air inlet neck structure according to claim 1, wherein the admission pipe coaxial with the mixing chamber comprises a wall portion in a shape of a frustum of a pyramid having n sides and each flap has a generally triangular shape and a base which is pivotally connected to a respective side of the frustum of a pyramid.

7. An air inlet neck structure according to claim 6, wherein the flaps are cast in one integral piece with the sides of the frustum of a pyramid, the pivotal connection being achieved by a reduction in section at an intersection between each flap and a respective side of the frustum of a pyramid, and means are provided for returning each flap to a retracted position thereof.

8. An air inlet neck structure according to claim 6, wherein the flaps are separate from the admission pipe, the pivotal connection of each flap to the respective side of the frustum of a pyramid is constituted by an adhesive strip and means are provided for returning each flap to the retracted position thereof.

9. An air inlet neck structure according to claim 7, wherein the return means comprise a spring having one end connected to the respective side of the frustum of a pyramid and an opposite end connected to the flap.

10. An air inlet neck structure according to claim 1, wherein the flaps comprise actuating means cooperative with a shoulder provided on the cylindrical member.

11. An air inlet neck structure according to claim 10, wherein the actuating means comprise a fin integral with each flap and extending in a plane substantially perpendicular to the plane of the flap.

12. An air inlet neck structure according to claim 10 wherein the cylindrical member comprises cavities provided in facing relation to the actuating means and adapted to receive the actuating means when the flaps are in the retracted position thereof.

13. An air inlet neck structure according to claim 6, wherein n is equal to 6.

14. An air inlet neck structure according to claim 1, wherein the admission pipe coaxial with the mixing chamber is the cold air admission pipe.

15. An air inlet neck structure according to claim 1, wherein said cylindrical member is mounted to be movable around the mixing chamber.

16. An air inlet neck structure according to claim 1, wherein the cylindrical member is mounted to be rotatable between the mixing chamber and an admission chamber into which opens said second admission pipe, between a position in which openings provided in said cylindrical member are located in facing relation to openings formed in a wall of the admission chamber, and a position for closing the openings of the admission chamber by solid portions of the cylindrical member.

17. An air inlet neck structure according to claim 1, wherein the admission pipe coaxial with the mixing chamber comprises a wall portion in the shape of a frustum of a pyramid having n sides and each flap has a general shape of a triangle having a base pivotally connected to a respective side of the frustum of a pyramid.

18. An air inlet neck structure according to claim 17, wherein the flaps are cast with the respective sides of the frustum of a pyramid, the pivotable connection is achieved by a reduction in section at an intersection between each flap and the respective side of the frustum of a pyramid, and means are provided for returning each flap to the retracted position thereof.

19. An air inlet neck structure according to claim 17, wherein the flaps are separate from the admission pipe, the pivotal connection of each flap to the corresponding side of the frustum of a pyramid is formed by an adhesive strip, and means are provided for returning each flap to the retracted position thereof.

20. An air inlet neck structure according to claim 18, wherein the return means comprise a spring having one end connected to the respective side of the frustum of a pyramid and an opposite end connected to the flap.

21. An air inlet neck structure according to claim 1, wherein the cylindrical member has means for actuating the flaps, cooperative with a fin in one integral piece with each flap and extending in a plane substantially perpendicular to the plane of the flap, so as to shift the flaps between a position for completely closing said first admission pipe by said flaps and a retracted position thereof.

22. An air inlet neck structure according to claim 21, wherein the actuating means comprise a flange on an inner wall of the cylindrical member and in which flange are formed n ramps, each of the ramps being disposed in facing relation to a respective fin.

23. An air inlet neck structure according to claim 17, wherein n is equal to 6.

24. An air inlet neck structure according to claim 1, wherein the admission pipe coaxial with the mixing chamber is the cold air admission pipe.

* * * * *